United States Patent [19]

Smits

[11] 3,770,937

[45] Nov. 6, 1973

[54] TEMPERATURE CONTROLLED ELECTRIC HAND SOLDERING IRON

[76] Inventor: Marius Smits, Furstenallee 24, 3548 Arolsen/Waldeck, Germany

[22] Filed: Dec. 21, 1971

[21] Appl. No.: 210,505

[30] Foreign Application Priority Data
Dec. 22, 1970  Germany............ P 20 63 276.2

[52] U.S. Cl............... 219/241, 219/229, 219/236, 219/238, 219/513, 337/324
[51] Int. Cl. ................ H05b 1/02, B23k 3/04
[58] Field of Search............... 219/241, 494, 513, 219/221, 227–241, 513; 337/321, 324

[56] References Cited
UNITED STATES PATENTS

| 2,908,793 | 10/1959 | Aloi ..................... 219/241 |
| 2,159,869 | 5/1939 | Thomas et al. ........... 219/241 |
| 1,855,707 | 4/1932 | De Langie............. 219/241 UX |
| 2,982,838 | 5/1961 | Tyler..................... 219/241 |

FOREIGN PATENTS OR APPLICATIONS

| 800,662 | 8/1958 | Great Britain............ 219/241 |
| 930,351 | 8/1947 | France................. 219/241 |

Primary Examiner—A. Bartis
Attorney—Elliot A. Salter et al.

[57] ABSTRACT

A temperature controlled electric hand soldering iron has a handle which carries a support tube in which the soldering tip and a heating element are mounted. The soldering tip has a bore formed therein in which the support tube is received, a liquid expansion control thermostat being located in the bore at the innermost end thereof. The thermostat is partially enclosed within the tube and extends forwardly thereof for contact with the soldering tip at the end of the bore. A switch is located in the handle for controlling the heating element and is responsive thermally to a capilliary tube that projects from the thermostat.

1 Claim, 13 Drawing Figures

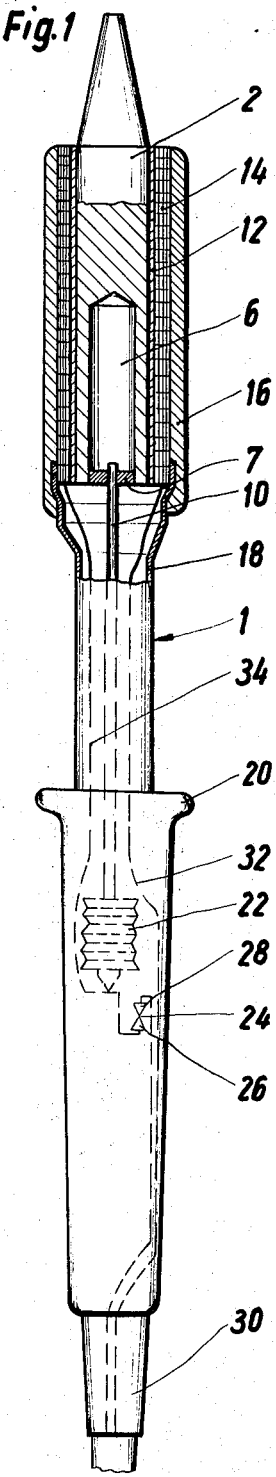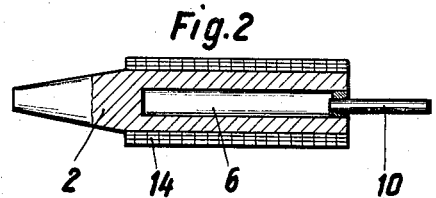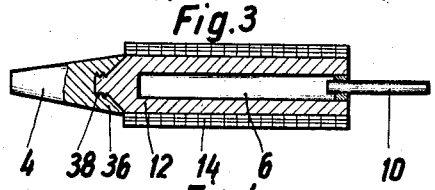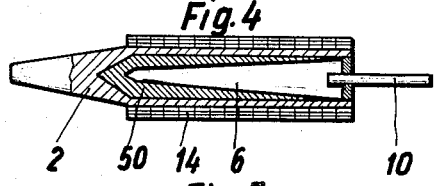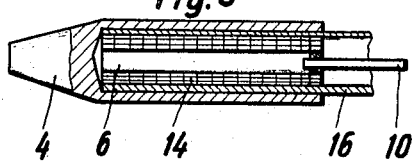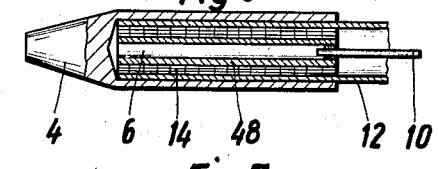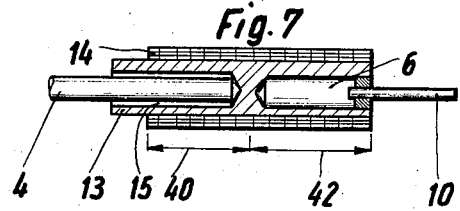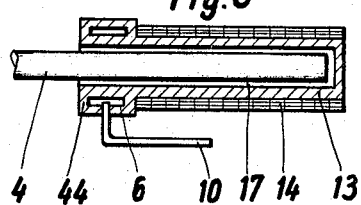

TEMPERATURE CONTROLLED ELECTRIC HAND SOLDERING IRON

BACKGROUND OF THE INVENTION

This invention relates to a temperature controlled electric hand soldering iron wherein the soldering tip and the heating element are arranged at the end of a supporting tube associated with the handle.

Soldering irons provided with thermostats have the advantage that the filament winding thereof may be designed for use with electrical energy that is greater than with a soldering iron without a thermostat, since the thermostat prevents the soldering tip from overheating. In addition to soldering iron with a thermostat may also have to a certain degree a smaller heat capacity. Thus, with the use of thermostats comparitively smaller soldering apparatus may be manufactured having the same power capacity as larger apparatus.

Soldering irons are already known wherein the temperature in the soldering tip is determined by means of a thermocouple element or by means of a so-called resistance thermometer. A disadvantage in this construction is that the changes in temperature may not be directly used for the control of the heating current, but that an additional electrical amplifier is required.

It is further known to use for the temperature control of soldering irons the differing coefficient of expansion of two materials, for example, rod type thermostats. Some drawbacks of this control system are:

1. a relatively high inertia occurs—that is to say that such thermostats are suitable only for relatively slow temperature changes—; and
2. that there are developed but relatively small differences in length of the two materials which must be utilized by a suitable mechanism in order to obtain a switching operation.

It is further known to utilize for the temperature control of soldering irons the spontaneous magnetization of ferromagnetic materials for temperatures dependent on the alloy (Curie point). Such a temperature control is limited to the fixed temperature determined by each case by the Curie point.

SUMMARY OF THE INVENTION

The present invention includes a temperature control for electric soldering irons which is relatively simple to manufacture and provides various feed paths for a given temperature range and in connection therewith relative switching safety.

According to the invention, this problem is solved by a liquid expansion control device having a thermostat tip. Further, an expansion element and an electrical switch operated by said expansion element for the heating element are accommodated in the handle, and a capillary tube connects the thermostat chamber and the expansion element.

According to an embodiment, the heating element is formed directly on the soldering tip and the thermostat chamber within the soldering tip.

Since in order to obtain adequate feed paths for the current, the thermostat chamber must have a certain volume, the heating element will in case of demand for extremely small soldering irons extend substantially throughout the length of the thermostat chamber. In the use of material that is corrosion-resistant to heat for the soldering tip, difficulties may arise in transferring the thermal energy given off by the filament winding through the cross section of the material that is reduced by the thermostat chamber toward the working end of the soldering tip.

According to the invention, this problem may be solved by providing in the thermostat chamber an insert consisting of a material which has a heat conductivity higher than the material from which the soldering tip is made and, which has at least one tubular section having a wall thickness increasing toward the working end of the soldering tip. A particularly effective heat conductivity can be obtained, for example, if the tubular insert is provided with an interior space tapering toward the working end of the soldering tip. In that case, the insert may have a conical bottom tapering toward the working end of the soldering tip. Furthermore, the soldering tip may be provided with a separate working end heat-conductively connected with the soldering tip.

As a liquid filling for the heat expansion control device, oils may be used that are adapted for temperature ranges normally used in soft soldering operation. However, the risk may occur that damage will be caused to the oils by local overheating. This risk may be removed by forming the heating element such that at each place on the heating place no more heat is given off than be transferred from the respective place without overheating the oil. To this end the heating element can be, for example, developed so that the filament current at the ends where a greater dissipation of heat toward the handle or toward the working end of the soldering tip takes place, is increased by a narrower winding of the heating wire at the ends of the heating element. Moreover, the above described incroporated material of high heat conductivity serves the same purpose.

In a further embodiment, a carrier for the heating element is provided which has a bore to receive a replaceable soldering tip, and the thermostat chamber is developed so as to be concentric with the bore in said carrier. In that case, the thermostat chamber may be arranged behind the bottom of the bore receiving the soldering tip in said carrier for the heating element. But the thermostat chamber may also be formed as an annular chamber in the carrier for the heating element, which annular chamber surrounds the bore receiving the soldering tip. It is particularly advantageous to arrange said annular chamber at the outer end of the carrier for the heating element in front of the end of the heating element. Thus, a particularly high sensibility to respond is obtained.

In another embodiment a carrier for the heating element is provided which has a bore to receive a replaceable soldering tip, the thermostat chamber in said carrier being formed so as to be concentric with the bore receiving the soldering tip. In this embodiment, and also in that described before with a carrier for the heating element and a thermostat chamber formed as an annular chamber, the bore receiving the soldering tip may extend throughout the whole length of the carrier for the heating element.

Further, in an alternative embodiment, the heating element is mounted in the end of the supporting tube or of a tubular member connected with the supporting tube and held by the latter, a thermostat chamber being provided in the supporting tube in front of the heating element, and the soldering tip which includes a tubular end being heat-conductively slipped onto the tube end in engaging relation over the heating element. In that case the end of the supporting tube may be closed, the thermostat chamber then abutting against the closed tube end. A further alternative is to form the supporting tube with an open end and to have the thermostat chamber protrude from said end of the supporting tube at least so far that the thermostat chamber is in direct heat-conductive contact with the soldering tip. Also, this latter embodiment has the advantage that the thermostat chamber may be located closely adjacent to the working end of the soldering tip, whereby a high sensibility to respond is obtained. Another advantage is that the risk of the oil in the thermostat chamber being overheated is materially reduced.

DESCRIPTION OF THE DRAWING

The various embodiments to this invention are illustrated in the accompanying drawings and described hereinafter in detail:

FIG. 1 is an elevational view with parts shown in phantom and in section of an electric hand soldering iron illustrating one form of the invention embodied herein;

FIG. 2 is a sectional view of a modified form of the working end of the soldering tip;

FIG. 3 is a sectional view of another modified form of the working end of the soldering tip;

FIG. 4 is a sectional view of still another modified form of the working end of the soldering tip;

FIG. 5 is a sectional view of still another modified form of the working end of the soldering tip;

FIG. 6 is a sectional view of still another modified form of the working end of the soldering tip;

FIG. 7 is a sectional view of still another modified form of the working end of the soldering tip;

FIG. 8 is a sectional view of still another modified form of the working end of the soldering tip;

DESCRIPTION OF THE PREFERRED EMBODIMENTS

Figures 9, 9A, 9B:
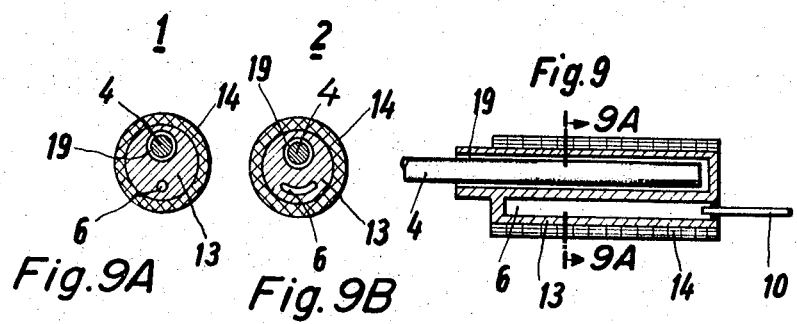
FIG. 9 is a sectional view of still another modified form of the working end of the soldering tip.
FIG. 9a is a sectional view taken along line 9a—9a in FIG. 9.
FIG. 9b is a sectional view similar to FIG. 9a but showing a modified configuration fo the thermostat chamber.

The soldering iron according to FIG. 1 shows a conventional handle 20 having an electric cable 30 that includes cable wires 32 and 34 extending into the lower end thereof through a rubber sleeve. A supporting tube 18 is mounted in the upper end of said handle 20, the tube 18 carrying at its upper end a sheath 16 in which a cylindrical heating element 14 is accommodated. The heating element 14 has an inner tube 12 located therein that receives a soldering tip 2 on the outermost end thereof.

The hand soldering iron as shown in FIG. 1 is provided with a thermostat which includes a liquid expansion control device. The liquid expansion control device is formed with a thermostat chamber 6 and an expansion member 22, such as a bellows, which are interconnected through a capillary tube 10. The thermostat chamber 6, the capillary tube 10 and the expansion member 22 are all filled with a liquid, preferably a synthetic oil.

The expansion member 22 is operable to engage a switch 24 which has a movable contact 26 and a stationary contact 28. The switch 24 is connected to the cable wire 34, while both cable wires 32 and 34 are connected to the heating element 14.

The thermostat chamber 6 is formed by an axial bore that communicates with the rear end of the soldering tip. The bore is closed at its rear end by a bottom 7 that is soldered or welded to said rear end. The capillary tube 10 is soldered into the bottom 7, whereby the thermostat chamber 6 is located directly within the soldering tip so as to provide accuracy and sensibility for control of the device in response to temperature changes in the soldering tip.

The stationary contact 28 is adjustable for setting and adjusting the temperature range within which the soldering iron is to work.

In the further embodiments which now follow and are described with reference to FIGS. 2 to 11 only that part is illustrated which is arranged in the end of the supporting tube 18 or in the sheath 12 carried by said supporting tube 18 or in another tubular structural element, each of the shown capillary tubes being connected with an expansion member in the handle in a manner as illustrated in FIG. 1, while the filament windings are provided with electrical connections not shown in the drawing.

In the embodiment according to FIG. 2 the arrangement of the thermostat chamber 6 in the soldering tip 2 corresponds to the arrangement as shown in FIG. 1. However, in FIG. 2, the heating element 14 is mounted directly on the soldering tip. This provides for a smaller outer diameter of the sheath 16 that receives the soldering tip therein and also provides for improved heat transfer.

The embodiment illustrated in FIG. 3 substantially corresponds to that shown in FIG. 1, but differs therefrom in that the soldering tip 2 is provided at its inner end with a conical attachment 36 which extends in a cylindrical member 38. Mounted on the latter is a separate working tip 4 provided with an inner cone face corresponding to the cone face 36, wherein contact with the soldering tip 4 is established. The fastening of the soldering tip may be effected through a structure mounted on the cylindrical member 38.

In soldering tips in which the heating element is mounted directly thereon, materials are required that resist heat corrosion. However, such materials are normally not good heat conductors; and thus, they require thicker wall cross-sections for a predetermined heat transfer which under a given volume in the thermostat chamber require wider outer diameters. These disadvantages are avoided in the embodiment shown in FIG. 4 in that an insert 50 is mounted in the thermostat chamber 6, the insert 50 consisting of a material of high heat conductivity, such as copper or aluminum. In the embodiment as shown in FIG. 4, the insert is substantially of cylindrical shape while its interior is formed in a tapered cone. Thus, a continuous increase of the wall thickness toward the working end of the soldering tip is obtained. The insert according to FIG. 4 is provided with a bottom which tapers into the working end of the soldering tip, thus forming a relatively large heat transfer surface. Such an insert insures a good heat transfer toward the tip, avoiding at the same time a possible local overheating of the oil in the thermostat chamber.

With reference to FIG. 5 the heating element 14 is housed in the interior of a tube 16 which, for example, may be integral with the supporting tube 18 or connected therewith. In that case the heating element is provided at the outer end of the tube 16. In the interior of the heating element 14 a thermostat chamber 6 is housed which, for example, may also be the carrier of the heating element, but it need not be. In this embodiment the soldering tip 4 has a rearwardly extending tubular portion by means of which the soldering tip is slipped onto the tube in heat-conductive contact. This type of soldering tip is known as a cap-shaped tip. In this embodiment the heating element radiates heat to both sides, i.e., within and without and is particularly suitable for soldering irons which in operation must have a slim working end.

With reference to FIG. 6, the embodiment illustrated therein corresponds substantially to that shown in FIG. 5, but differs therefrom in that the thermostat chamber 6 has a thicker wall 48 which consists of a well heat-conductive material, and through which the thermal action on the oil confined in the thermostat is rendered uniform. On the other hand, the same effect could be obtained by mounting a thick-walled tube on a thin-walled thermostat chamber.

With reference to FIG. 7, a separate carrier 13 for the heating element is provided on which the heating element 14 is directly mounted. A thermostat chamber 6 formed by a bore and a cover plate is provided at the rear end of said carrier 13, the thermostat chamber 6 extending to about half-way of the carrier 13. A bore 15 extends into the carrier 13 from the opposite end, into which bore 15 a separate soldering tip 4 detachably connectable with the carrier 13 is inserted. The soldering tip 4 is held by screws or other clamping means not shown. As illustrated in FIG. 7, the heating element extends over the axial length of the thermostat chamber 6 as well as over a substantial portion of the length of the bore 15. In this case the heat emission may be differently developed in a predetermined proportion in the two sections indicated at 40 and 42 in such a manner that the amount of heat produced and given off in section 40 is much higher than the amount of heat produced in section 42. This can be obtained by locating the windings of the heating element in close relation.

While in the embodiment according to FIG. 7, the bore receiving the soldering tip and the bore forming the thermostat chamber are concentrically arranged, the embodiment according to FIG. 8 provides for a bore 17 receiving the soldering tip 4 and extending substantially over the entire length of the carrier 13. If it is desirable, the bore 17 may extend throughout the length of the carrier 13. Located concentric with the bore 17 in the carrier 13 is an annular chamber 44, the capillary tube 10 being connected to said annular chamber 44. As can be seen from FIG. 8, the annular chamber 44 is located in that end of the carrier 13 which is adjacent to the working end of the soldering tip 4. Thus, the annular chamber 44 is located in front of one end face of the heating element 14. Therefore, a withdrawal of heat from the soldering tip 4 directly effects the thermostat or annular chamber 44 and accordingly acts as a control pulse before the temperature in the entire soldering tip has appreciably dropped.

Moreover, with this embodiment the oil in the annular chamber 44 is prevented from overheating.

FIG. 9 shows a further modification of the soldering tip. A bore 19 is provided in the carrier and receives the soldering tip 4 therein. Although not shown, the bore may be open at both ends. Concentric with the bore 19 is a thermostat chamber 6 that is located in the carrier 13 for the heating element. As can be seen from FIGS. 9A and 9B, the chamber 6 may have different configurations, such as a circular cross-section or a sickle type cross-section. An essential requirement for the shape of the corss-section is the volume necessary for the chamber.

Figure 10:
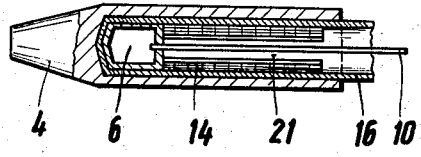
FIG. 10 is a sectional view of still another modified form of the working end of the soldering tip.

The embodiment as shown in FIG. 10 basically corresponds to the embodiment of FIGS. 5 and 6. Further, in FIG. 10 a soldering tip is slipped onto a tube 16, a cylindrical member being located within the tube 16 which is closed at its leading end. Abutting against the bottom of the tube 16 is a thermostat chamber 6, the outer wall of which bears against the inner wall of the tube 16. A heating element 14 is located within said tube 16 and is positioned rearwardly of the thermostat chamber 6. The capillary tube 10 passes through the passage in the interior of the heating element 14. If necessary the cavity 21 can be filled with an insulating material. This embodiment has the advantage that a withdrawal of heat from the soldering tip immediately effect the thermostat chamber 6, and an immediate response thereto is obtained. Moreover, in this embodiment, the thermostat chamber 6 has an increased capacity, but is with a relatively thin head, which also improves the ability of the device to respond. Finally, the oil in the thermostat chamber is prevented from local overheating.

Figure 11:
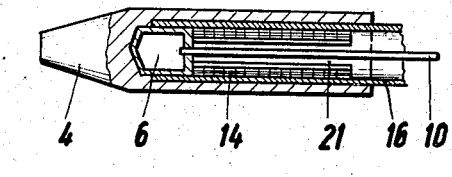
FIG. 11 is a sectional view of still another modified form of the working end of the soldering tip.

With reference to FIG. 11, the embodiment differs from that according to FIG. 10 in that the tube 16 is open at its front end and that the thermostat chamber 6 protrudes from the tube end and is in direct heat-conductive contact with the soldering tip.

Other modifications and combinations of the described features are contemplated and each of the heating elements in the various embodiments may be so formed that a desired distribution of temperature is obtained. While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. An electric hand soldering iron, comprising a handle, an elongated tubular member joined to said handle at an end thereof and in substantially coaxial relation thereto, said tubular member being open at least at the end thereof that is remote from said handle, a soldering tip having a concentric bore formed therein, said bore extending for a substantial portion of the soldering tip and having a diameter that is dimensioned for receiving the tubular member in friction fitting relation therein, wherein said tubular member is secured within the bore of the soldering tip and is spaced from the end wall thereof and projects outwardly from the rearmost end thereof, a thermostat having a sealed-heat sensor chamber located in said bore at the innermost end thereof, said heat-sensor chamber being partially enclosed within said tubular member and extending forwardly beyond the open end thereof for contact with the soldering tip at the end of the bore, a tubular heating element positioned within said tubular member in concentric relation directly behind said heat-sensor chamber and being wholly enclosed in said tubular member within the soldering tip, a capillary tube projecting into said sealed heat-sensor chamber and extending therefrom through said heating element and tubular member into said handle, and switch means located in said handle and interconnected to said capillary tube and to a source of electrical energy, said switch means being responsive to the temperature within said heat-sensor chamber as reflected thereto by said capillary tube for controlling flow of electrical energy to said heating element, wherein the heat directed to said soldering tip is effectively controlled.

* * * * *